UNITED STATES PATENT OFFICE.

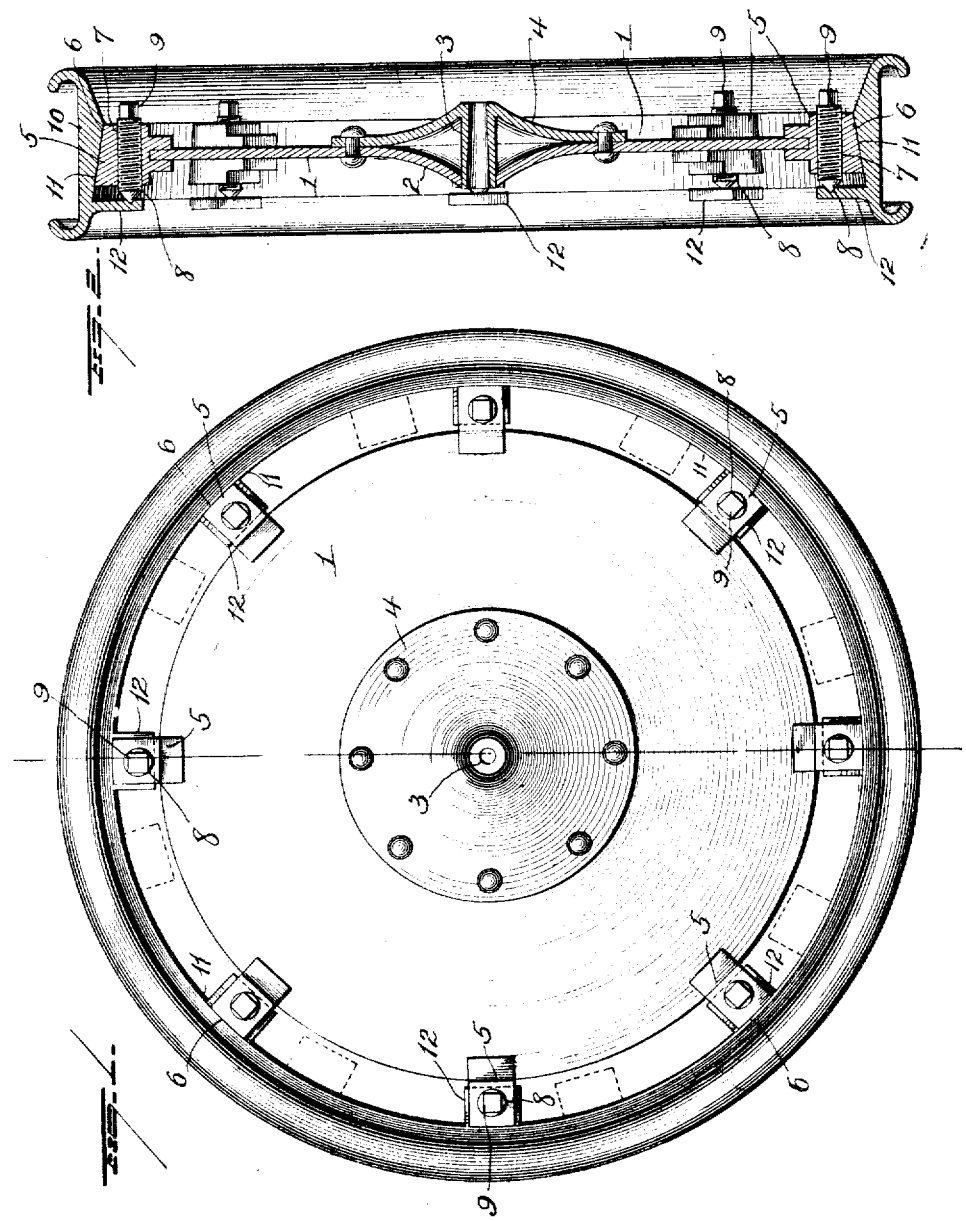

WILLIAM H. DAILY, OF TUCSON, ARIZONA.

WHEEL.

1,290,920.  Specification of Letters Patent.  Patented Jan. 14, 1919.

Application filed February 18, 1918. Serial No. 217,890.

*To all whom it may concern:*

Be it known that I, WILLIAM H. DAILY, a citizen of the United States, and a resident of Tucson, in the county of Pima and State of Arizona, have invented certain new and useful Improvements in Wheels; and I do hereby declare the following to be a full, clear, and exact description of the invention, such as will enable others skilled in the art to which it appertains to make and use the same.

This invention relates to improvements in wheels and more particularly to an improved demountable rim structure, the object of the invention being to provide simple and efficient means which will admit of the quick application of the rim to the body of the wheel or its removal therefrom, and to so construct such means that the rim will be securely locked in place and possibility of its accidental displacement avoided.

With this and other objects in view, the invention consists in certain novel features of construction and combinations of parts as hereinafter set forth and pointed out in the claim.

In the accompanying drawings, Figure 1 is a side elevation of a wheel embodying my improvements, and Fig. 2 is a transverse sectional view.

1 represents the body of the wheel and may consist of a disk preferably of steel having its central portion 2 bulged somewhat and provided with an opening to receive one end of a hub or spindle bearing 3. This hub may be made integral with the central portion of a convex, perforated plate 4 riveted at its peripheral portion to the disk or body portion 1.

Welded or otherwise securely fixed at intervals to the peripheral portion of the disk 1 is a plurality of lugs 5, the outer face 6 of each of which is beveled transversely. Each of the lugs 5 is made with a transverse hole 7 having a threaded wall to receive a screw 8 preferably having a long thread, one end of each screw having an angular head 9 to receive a wrench, while the other end of each screw is pointed for a purpose hereinafter explained.

The rim 10 of the wheel is mounted upon the lugs 5 and is provided with an inner transverse beveled face 11 to engage the beveled faces 6 of the lugs 5. The rim 10 is provided near one edge with inwardly projecting lips 12, said lips being provided with sockets 13 to receive the pointed ends of the screws 8.

In applying the rim to the wheel, the same will first be placed so that the lugs 5 will occupy positions as indicated by the dotted lines and said rim will then be turned slightly until the beveled portion of the rim becomes disposed over the beveled faces of the lugs 5. The screws 8 will then be tightened and by their coöperation with the lips 12, the beveled face of the rim will become tightly clamped against the beveled faces of the lugs 5 and the rim will thus be locked securely in place.

To remove or demount the rim, it is simply necessary to loosen the screws 8, turn the rim slightly and then the rim may be removed from the body of the wheel.

Slight changes might be made in the details of construction of my invention without departing from the spirit thereof or limiting its scope and hence I do not wish to restrict myself to the precise details herein set forth.

Having fully described my invention, what I claim as new and desire to secure by Letters-Patent, is:

The combination with the body portion of a wheel and beveled lugs fixed thereto, of a rim having a beveled inner portion and inwardly projecting lips, and screws passing transversely through said lugs and engaging the lips of the rim.

In testimony whereof, I have signed this specification in the presence of two subscribing witnesses.

WILLIAM H. DAILY.

Witnesses:
W. W. APGAR,
J. A. CULBERTSON.